United States Patent
Nelson et al.

(10) Patent No.: US 9,008,310 B2
(45) Date of Patent: Apr. 14, 2015

(54) IMPLEMENTING ENCRYPTED CONTENT IN A GAME

(71) Applicant: Disney Enterprises, Inc., Burbank, CA (US)

(72) Inventors: Robert Nelson, Salt Lake City, UT (US); Jose Villeta, Playa Vista, CA (US)

(73) Assignee: Disney Enterprises, Inc., Burbank, CA (US)

( * ) Notice: Subject to any disclaimer, the term of this patent is extended or adjusted under 35 U.S.C. 154(b) by 116 days.

(21) Appl. No.: 13/932,967

(22) Filed: Jul. 1, 2013

(65) Prior Publication Data

US 2015/0003609 A1 Jan. 1, 2015

(51) Int. Cl.
| | |
|---|---|
| *H04K 1/00* | (2006.01) |
| *H04L 9/28* | (2006.01) |
| *A63F 13/98* | (2014.01) |
| *H04L 12/40* | (2006.01) |
| *H04L 29/06* | (2006.01) |
| *H04L 9/16* | (2006.01) |

(52) U.S. Cl.
CPC .............. *H04L 9/28* (2013.01); *H04L 12/40104* (2013.01); *H04L 29/06659* (2013.01); *H04L 9/16* (2013.01); *A63F 13/02* (2013.01); *H04L 63/0428* (2013.01); *H04L 67/38* (2013.01)

(58) Field of Classification Search
CPC ....... H04L 9/28; H04L 63/0428; H04L 63/38; H04L 9/0822; H04L 9/16; H04L 12/40104; H04L 29/06659
See application file for complete search history.

(56) References Cited

U.S. PATENT DOCUMENTS

| | | | | |
|---|---|---|---|---|
| 7,266,847 | B2 * | 9/2007 | Pauker et al. | 726/27 |
| 7,739,371 | B2 * | 6/2010 | Ikegaya et al. | 709/223 |
| 8,831,228 | B1 * | 9/2014 | Agrawal et al. | 380/286 |
| 2008/0148067 | A1 * | 6/2008 | Sitrick et al. | 713/193 |
| 2012/0295703 | A1 | 11/2012 | Reiche et al. | 463/31 |

OTHER PUBLICATIONS

Kloster, Benjamin, "Wanted: Encryption Scheme for Copy Protection Purposes", Retrieved from the Internet http://stackoverflow.com/questions/14529732/wanted-encryption-scheme-for-copy-protection-purpose, Jan. 25, 2013, XP055152568, 2 pages.

Dagamant, "Skylanders Hacking", Retrieved from the Internet http://web.archive.org/web/20120309212642/http://www.suncries.com/skylaners-hacking, Feb. 27, 2012, XP055152538, 8 pages.

Extended European Search Report issued in European Patent Application No. 14175300.4, dated Nov. 19, 2014.

* cited by examiner

*Primary Examiner* — Krisna Lim

(74) *Attorney, Agent, or Firm* — Pillsbury Winthrop Shaw Pittman LLP

(57) ABSTRACT

A device, method, and an action figure toy for implementing encrypted content for implementation in a game are disclosed. The encrypted content may relate to physical objects, such as action figure toys corresponding movie characters and/or any other physical objects. Such content may be encrypted separately and distinctively during a development stage of the game. Decryption keys for decrypting the encrypted content may be stored on and distributed with corresponding physical objects. A set of encrypted content associated with such a physical object may be decrypted upon presence of the physical object detected by a reader configured to read information stored on the physical object and responsive to receiving the decryption key stored on the physical object. The decrypted content may be implemented in the game responsive to the presence of the physical object on the reader.

20 Claims, 3 Drawing Sheets

IMPLEMENTING ENCRYPTED CONTENT IN A GAME

FIELD OF THE DISCLOSURE

This disclosure relates to implementing encrypted content in a game, the encrypted content being implemented by a device configured to decrypt the encrypted content using a decryption key stored on a physical object.

BACKGROUND

Devices that implement content by detecting presence of action figure toys on a reader are known. In those devices, some of the content stored on the consoles is associated with action figure toys and implemented in the game only upon the action figure toys being present on the reader. The presence of the action figure toys on the reader is typically made by detecting tags stored on the action figure toys using technologies such as radio frequency identification (RFID) or near field communication (NFC). However, those devices may be hacked such that content associated with action figure toys not present on the reader may be revealed by the hacker without a permission of a provider of the game.

SUMMARY

One aspect of the disclosure relates to implementing encrypted content associated with physical objects in a game. One or more sets of game content may be encrypted separately and distinctively, and may be associated with corresponding physical objects. Decryption keys for decrypting the encrypted content may be stored on and distributed with the physical objects. A device may be configured to receive the decryption keys from the physical objects through a reader using technologies such as RFID, NFC, Bluetooth, and/or any other suitable communication technology for reading information stored on the physical objects. Upon presence of the physical object being detected by the reader and receiving the decryption key stored on the physical object, the device may decrypt a set of encrypted content associated with the physical object using the decryption key, and implement the decrypted content in the game. Unlike the conventional devices, this facilitates implementing encrypted content, which may not be easily hacked, in a game such that the encrypted content may be revealed in the game only when corresponding physical objects are present on the reader.

In some implementations, a device configured to implement encrypted content in a game may be configured to execute one or more of a game module, an object detection module, a decryption module, and/or other modules.

Object detection module may be configured to receive information stored on one or more physical objects from a reader operatively coupled to or included in the device. The received information may include identification information of the physical objects, decryption keys associated with the physical objects, information indicating one or more sets of encrypted content are associated with the physical object for implementation in a game executed by the device, user progress information in the game related to the physical objects, information indicating unique identifiers associated with a game content provider such as S.W.I.D, and/or any other information stored on the physical objects. In some implementations, the object detection module may be configured to receive such information from the reader at a sampling rate pre-configured by the provider, administrator, developer, and/or any other entities related to the device. Simultaneously or alternatively, the object detection module may be configured to receive such information dynamically as it is pushed to the device by the reader. In some implementations, the object detection module may be configured to parse the received information using parsing semantics pre-configured by the provider, administrator, developer, and/or any other entities related to the device. In some examples, the object detection module may be configured to determine the objects whose presence being detected by the reader correspond to one or more sets of encrypted content for implementation in the game. Such determination may involve obtaining information that specifies associations between physical objects and encrypted content for implementation in the game.

Decryption module may be configured to decrypt encrypted content using decryption keys stored on physical objects responsive to the presence of physical objects being detected by the reader. For facilitating such decryptions, decryption algorithms for decrypting the encrypted content may be pre-configured by the provider, developer of the device, and/or any other entities related to the device at a configuration stage of the device. In some examples, the decryption module may be configured to decrypt different sets of encrypted content corresponding to individual physical objects. Such different sets of the encrypted content may be separately and distinctively encrypted by the provider, developer, administrator, moderator of the game, and/or any other entities related to the game at a development stage of the game such that distinctive decryption keys may be generated for the different sets of encrypted content. The decryption module may decrypt a set of encrypted game content associated with a first physical object using a decryption key stored on the physical object, responsive to the first physical object being present on the reader.

Game module may be configured to execute an instance of a game by implementing content associated with physical objects. The instance of the game may comprise characters, story, plots, narrative, game actions, activities, gameplays, user progress and/or any other game components that are related to the physical objects. Such game components may be provided in the game by implementing game content associated with the physical objects when the physical objects are present on the reader. The game module may be configured such that responsive to a first physical object being present on the reader and responsive to a first set of encrypted content associated with the first physical object being decrypted by the decryption module, the game module implements the first set of content in the game.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The embodiments will be more readily understood in view of the following description when accompanied by the below figures and wherein like reference numerals represent like elements, wherein.

DETAILED DESCRIPTION

Figure 1:
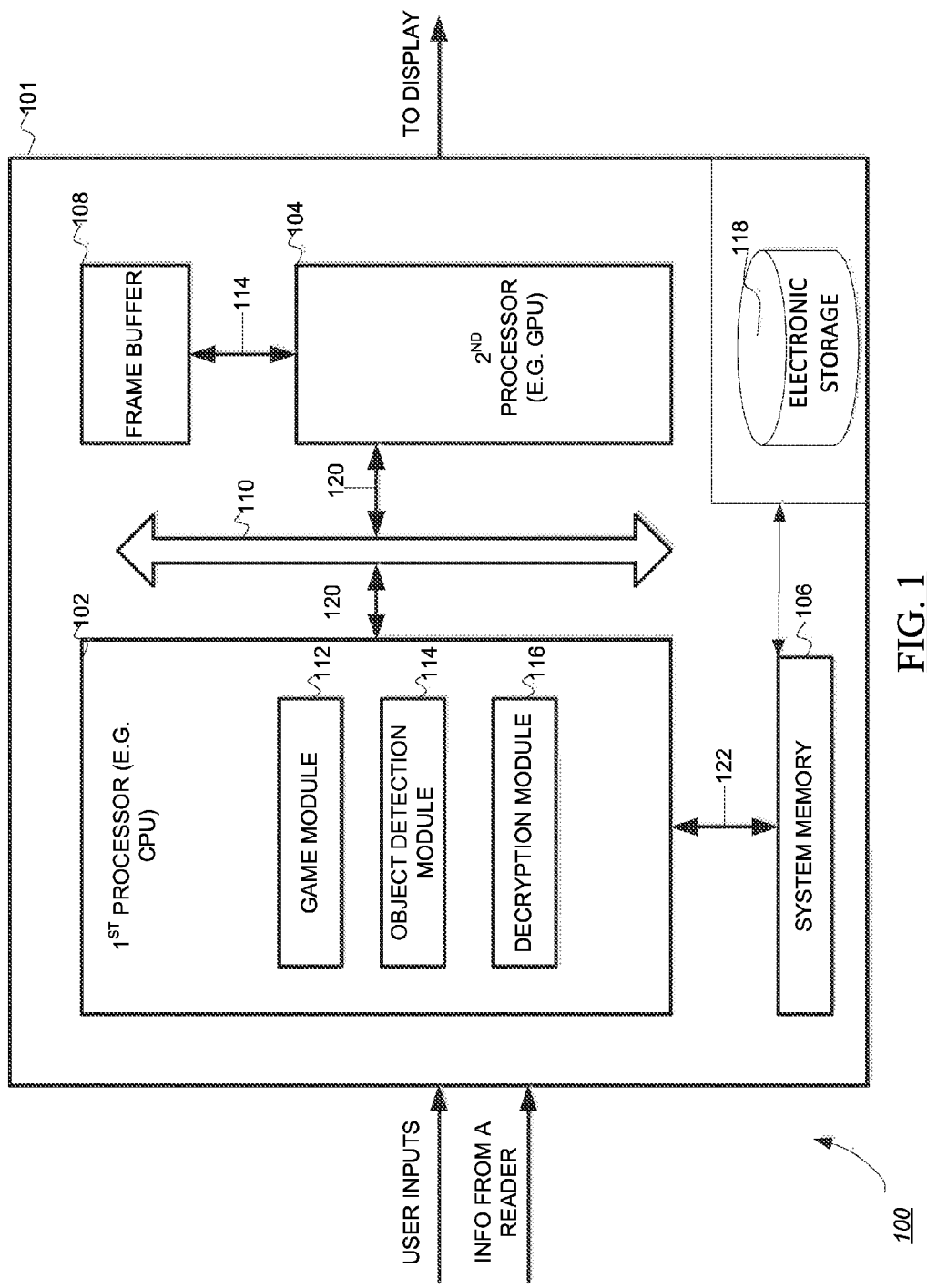
FIG. 1 illustrates one example of a device configured to implement encrypted content in a game.

FIG. 1 illustrates one example of a device 100 that is configured to implement encrypted content in a game. For protecting content related to physical objects, such as figurines corresponding to movie characters and/or any other physical objects, in a game, provider, developer, administrator, moderator, and/or any other entities related to the game may encrypt the content at a development stage of the game. Sets of the content may be encrypted separately and distinctively, and may be associated with corresponding physical objects. Decryption keys for decrypting the encrypted content may be stored on the physical objects and distributed with the physical objects. The device may receive a decryption key from a physical object upon presence of the physical object being detected by a reader coupled to the device. The device may decrypt a set of encrypted content associated with the physical object using the decryption key and implement the decrypted content in the game responsive to the presence of the physical object being detected by the reader. This may facilitate multi-tiered protections of game content associated with physical objects for implementation in a game only when the physical objects are present on the reader.

A system 100 configured to implement encrypted content in game may include a device 101, for example such as, a console, desktop computer, laptop computer, Netbook, handheld device (e.g., mobile or smart phone, tablet, etc.), media center, set top box, and/or any other suitable device that may execute an instance of game. In this example, device 101 is configured to execute one or more of a game module 112, an object detection module 114, a decryption module 116, and/or other modules.

Object detection module 114 may be configured to receive information indicating presence of one or more physical objects detected by a reader. The reader, which is not shown in this example for clarity of illustration, may be operatively included in or operatively coupled to the device 101 via any suitable wired or wireless communication through, such as but not limited to, universal serial bus (USB), Bluetooth, parallel ports, FireWire, Infrared, 3DS reader, and/or any other suitable wired or wireless communication. The reader may obtain information stored on one or more physical objects, such as identification information of the physical objects, one or more decryption keys associate with the physical objects, and/or any other information stored on the physical objects. The reader may obtain such information from the physical objects through technologies such as, RFID, NFC, Bluetooth, and/or any other communication technologies suitable for reading information stored on a physical object by the reader. In some implementations, the object detection module 114 may be configured to receive the information stored on the physical object(s) from the reader at a sampling rate preconfigured by the provider developer, manufacturer and/or any other entities related to the system 100. Simultaneously or alternatively, the object detection module 114 may be configured to receive such information from the reader dynamically as the information being pushed to the system 100 by the reader.

In any case, the received information from the reader by the object detection module 114 may comprise identification information about a physical object whose presence being detected by the reader, for example such as, one or more tag IDs associated with the physical object, a name of the physical object, a bar code associated with the physical object, and/or any other identification information about the physical object present on the reader. The received information may include one or more decryption keys associated with the physical object. In some examples, the received information may include information indicating one or more sets of encrypted content are associated with the physical object for implementation in a game, user progress information in the game related to the physical objects, and/or any other information regarding the physical object. In some examples, the object detection module 114 may be configured to parse the received information for the physical object's identification information, the decryption keys, the information indicating the encrypted content are associated with the physical object, and/or any other information included in the received information from the reader by the object detection module 114. To facilitate such parsing, the provider, developer, manufacturer, and/or any other entities related to the system 100 may specify parsing semantics, such as the length of the identification information, a delimiter that delimits one or more tag IDs from other fields in the obtained information, the length of the decryption key field, the length of the information indicating the association(s) between the physical object and encrypted content for implementation in the game, one or more delimiters, and/or any other parsing semantics for parsing the received information stored on the physical object from the reader.

In some examples, the object detection module 114 may be configured to determine presence of the physical object detected by the reader based on the received information from the reader. For example, the object detection module 114 may determine that a physical object is present when one or more tag IDs of the physical object are received from the reader. In some examples, the object detection module 114 may be configured to determine that the physical object whose presence being detected by the reader may correspond to one or more sets of encrypted content for implementation in the game executed by the system 100. In some implementations, such determinations may be made by the object detection module 114 by simply looking up in the information received from the reader. For example, as described above, the received information from the reader may comprise information indicating one or more sets of encrypted content are associated with the physical object present on the reader. Simultaneously or alternatively, associations between physical objects and corresponding encrypted content may be specified by the provider, developer, and/or any other entities related to the game during a development stage of the game, and stored on electronic storage coupled to or included in the system 100, for example such as, the electronic storage 118 as shown in this example. Accordingly, the object detection module 114 may be configured to examine such associations for determining that one or more sets of the encrypted content are associated with the physical object present on the reader.

Decryption module 116 may be configured to decrypt encrypted content for implementation in the game using decryption keys stored on the physical objects responsive to the presence of the physical objects being detected by the reader. For facilitating such decryptions, decryption algorithms for decrypting the encrypted content may be pre-configured by the provider, developer, and on any other entities related the game. In some examples, such decryption algorithms may be configured into the decryption module 116. Simultaneously or alternatively, the decryption algorithms may be stored on a system 100, for example, in the electronic storage 118. In those examples, at runtime of the system 100, the decryption module 116 may be configured to load the decryption algorithms into the system memory 106, for example through an entry point, and execute the decryption algorithms for decrypting the encrypted content.

In any case, the decryption module 116 may be configured to decrypt one or more of a set of encrypted content associated with a physical object whose presence being detected by the reader. The presence of the physical object may be indicated by the information received from the reader by the object detection module 114, as described above. Responsive to such information indicating the presence of the physical object present on the reader, the decryption module 116 may obtain the decryption key for the set of encrypted content. As also described above, in some examples, such a decryption key may be received from the physical object through the reader via the object detection module 114.

In some examples, the object detection module 116 may be configured to decrypt different sets of encrypted content corresponding to individual physical objects. Such different sets of encrypted content may be separately and distinctively encrypted by the provider, developer, administrator, moderator of the game, and/or any other entities related to the game at a development stage of the game. Such separate and distinctive encryption may involve encrypting the different sets of content using different encryption methods and generating distinctive decryption keys for decrypting the different sets of encrypted content.

For example, a set of content may be associated with a first physical object, such as an action figure toy corresponding to a first movie character, by the developer of the game during the development stage of the game. This set of content may be encrypted using any suitable encryption algorithm, for example, employing a symmetric cipher or an asymmetric cipher. The symmetric cipher may correspond to one or more of data encryption standard (DES), advanced encryption standard (AES), international data encryption algorithm (IDEA) and/or any other symmetric encryption standard(s). The asymmetric cipher may correspond to one or more of RSA encryption algorithm, DSA encryption algorithm, Diffie-Hellman algorithm, and/or any other asymmetric encryption algorithms. In any case, a first decryption key may be generated for decrypting this set of encrypted content at the development stage of the game.

Similarly, a second set of content associated with an action figure toy corresponding to a second movie character may be encrypted using an encryption algorithm the same as or different from the encryption algorithm used to encrypt the first set of content. A second decryption key may be generated for decrypting the second set of encrypted content. In some examples, such as when the first movie character corresponding to the first physical object appears in a different movie from the one the second movie character corresponding to the second physical object appears in, the two sets of encrypted content corresponding to the first physical object and the second physical object may be encrypted separately and the distinctively, for example by using two different ciphers. In those examples, the decryption keys for decrypting the two sets of encrypted a content may be generated as mutually exclusive to each other (e.g., using different ciphers) such that the first decryption key cannot be used to decrypt the second set of encrypted content and the second decryption key cannot be used to decrypt the first set of encrypted content.

Game module 112 may be configured to execute an instance of a game by implementing content associated with physical objects. The instance of the game space may reflect the state of the game. State information may include information such as, without limitation, position information of one or more objects, topography information, object status/shape information, battle information, score information, user or character progress information, user inventory information, progress information for one or more activities or actions, view information describing a view of the virtual space, and/or other information that describes the state of the virtual space.

The instance of the game may comprise a simulated space that is accessible by users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space. In some instances, the topography may describe a volume with one or more bodies positioned therein (e.g., a simulation of gravity-deprived space with one or more celestial bodies positioned therein). The instance executed by the computer modules may be synchronous, asynchronous, and/or semi-synchronous.

Within the instance of the game executed by game module 112, users may control characters, objects, simulated physical phenomena (e.g., wind, rain, earthquakes, and/or other phenomena), and/or other elements within the virtual space to interact with the virtual space and/or each other. The user characters may include avatars. As used herein, the term "user character" may refer to an object (or group of objects) present in the game that represents an individual user. The user character may be controlled by the user, with which it is associated. The user controlled element(s) may move through and interact with the virtual space (e.g., non-user characters in the virtual space, other objects in the virtual space). The user may initiate maneuvers to direct the movements of controlled character in the game. The user controlled elements controlled by and/or associated with a given user may be created and/or customized by the given user. The user may have an "inventory" of virtual goods and/or currency that the user can use (e.g., by manipulation of a user character or other user controlled element, and/or other items) within the game.

The user may participate in the instance of the game by taking actions. In some implementations, the user actions may be enabled by physical controls provided by, such as but not limited to, play buttons, joysticks, motion sensors, cameras, keyboards, mouse, and/or any other control device coupled to the system 100.

Within the instance of the game executed by the game module 112, contents may be implemented responsive to presence of physical objects on the reader. Characters, story, plots, narrative, activities, game actions, gameplays, user progress and/or any other game components may be associated with physical objects, such as action figure toys corresponding to movie characters and/or any other physical objects. Such game components may be provided in the instance of the game by implementing the content associated with the physical objects when the physical objects are present on the reader. For example, a character may not be provided in the instance of the game when a corresponding physical object is not present on the reader; but will be provided in the instance of game when the physical object is present on the reader. For such selective implementation of the game instance, the game module 116 may be configured to incorporate a set of content associated with a physical object into the instance of the game, responsive to the physical object being present on the reader. In some examples, the set of content associated with the physical object may be encrypted as described above. In those examples, for incorporating a set of encrypted content into the game, the game module 112 may be configured to instruct the decryption module 116 to decrypt the set of encrypted content. In some other examples, the set of encrypted content corresponding to the physical object present on the reader might have already been decrypted by the decryption module 116 as described above. In those examples, the game module 112 may simply incorporate the decrypted content into the instance of the game.

In this example, the device 101 employs a first processor 102 operatively connected to system memory 106 and a second processor 104 operatively connected to frame buffer 108. This is merely illustrative, as system 100 may be implemented with more or less processors than those shown. One or both of first processor 102 and/or second processor 104 may include a plurality of processing units operating in coordination in some other examples. As shown in this example, the first and second processors may be connected using a data bus or point to point connections, such as the system bus 110, which transfers data between each structure of the system 100. Although not shown, the system 100 may also include an input device, such as but not limited to, control pads, touch screen, motion sensor, mouse, trackball, touchpad, digitizing tablet, joystick, pointing stick, keypad, keyboard, camera, remote controller or any other suitable input device. The system 100 may include a display, which is also not shown in this example. The device 100 may include touch screen, liquid crystal display (LCD), light-emitting diode (LED) display, organic LED (OLED) displays, cathode ray tube (CRT) display, plasma display, projector screen, electroluminescent displays, vacuum fluorescent (VF) display, laser display, E-ink display or any other suitable displays, to name a few. The display may be configured to receive inputs from a user, for example a touchscreen, game pad, joystick, mouse, and/or any other user input device. One of ordinary skill in the art will recognize other suitable structure, such as but not limited to, an audio system, an i/o subsystem and/or any other structure may also be included in the system 100. The device may include one or more readers (not shown in this example) that are configured to read information stored on the physical objects using technologies such as RFID, NFC, Bluetooth, and/or any other suitable technology for reading information stored on physical objects present on the readers.

In this example, the device 101 includes electronic storage 118. Electronic storage 118 may comprise non-transitory storage media that electronically stores information. The electronic storage media of electronic storage 118 may include one or both of system storage that is provided integrally (i.e., substantially non-removable) with the system 100 and/or removable storage that is removably connectable to the system 100 via, for example, a port (e.g., a USB port, a firewire port, etc.) or a drive (e.g., a CD-ROM, a DVD-ROM, a disk drive, etc.). Electronic storage 118 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 118 may include one or more virtual storage resources (e.g., cloud storage, a virtual private network, and/or other virtual storage resources). Electronic storage 118 may store software algorithms, information determined by processors 102 and 104, and/or other information that enables server 104 to function as described herein.

In some examples, information stored on electronic storage 118 may include the content for implementation in the instance of the game executed by the game module 112. Such content may include encrypted content corresponding to physical objects as described above. The encrypted content may comprise different sets of content encrypted by the developer, provider, administrator, moderator, and/or any other entities related to the game. The different sets of encrypted content may be encrypted distinctively and a separately as described above.

In some exemplary implementations, the system 100 may be operatively connected to a cloud storage (not shown in this example for clarity) provided by a provider of the game content, a third party associated with the provider of the game content, a telecommunication service provider, an internet service provider, and/or any other entities that may provide a cloud storage to store the information related to the game. In those implementations, the information stored on the cloud storage may be obtained by the system 100 via any suitable wired and/or wireless connections between the system 100 and the cloud storage. Such obtained information may be stored by the system 100 locally in the electronic storage 118.

In this example, the processors 102 and 104 are configured to provide information processing capabilities in the device 101. The processors 102 and 104 may include one or more of a digital processor, an analog processor, a digital circuit designed to process information, an analog circuit designed to process information, a state machine, and/or other mechanisms for electronically processing information. In this example, the processor 102 is a central processing unit and the processor 104 is a graphic processing unit. As shown in this example, the processor 102 may be configured to communicate information 120, which may include view information for the game having selective implementation of encrypted content associated with physical objects, with the processor 104 through the data bus 110. Although processors 102 and 104 are shown in FIG. 1 as distinctive entities, this is merely illustrative. In some implementations, the processors 102 and 104 may be combined to form an integrated processor. It is also understood that the processor 102 and/or 104 may comprise however many cores to facilitate the processing provided by the processors 102 and/or 104.

The processor 102 may be configured to execute modules 112, 114, 116, and/or other modules. Processor 102 may be configured to execute modules 112, 114, 116, and/or other modules by software; hardware; firmware; some combination of software, hardware, and/or firmware; and/or other mechanisms for configuring processing capabilities on processor 102. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 112, 114, 116, are illustrated in FIG. 1 as being implemented within a single processing unit, in implementations in which processor 102 includes multiple processing units, one or more of modules 112, 114, 116, may be implemented remotely from the other modules. The description of the functionality provided by the different modules 112, 114, 116, described herein is for illustrative purposes, and is not intended to be limiting, as any of modules 112, 114, 116, may provide more or less functionality than is described. For example, one or more of modules 112, 114, 116, may be eliminated, and some or all of its functionality may be provided by other ones of modules 112, 114, 116. As another example, processor 102 may be configured to execute one or more additional modules that may perform some or all of the functionality attributed below to one of modules 112, 114, 116.

Figure 2:
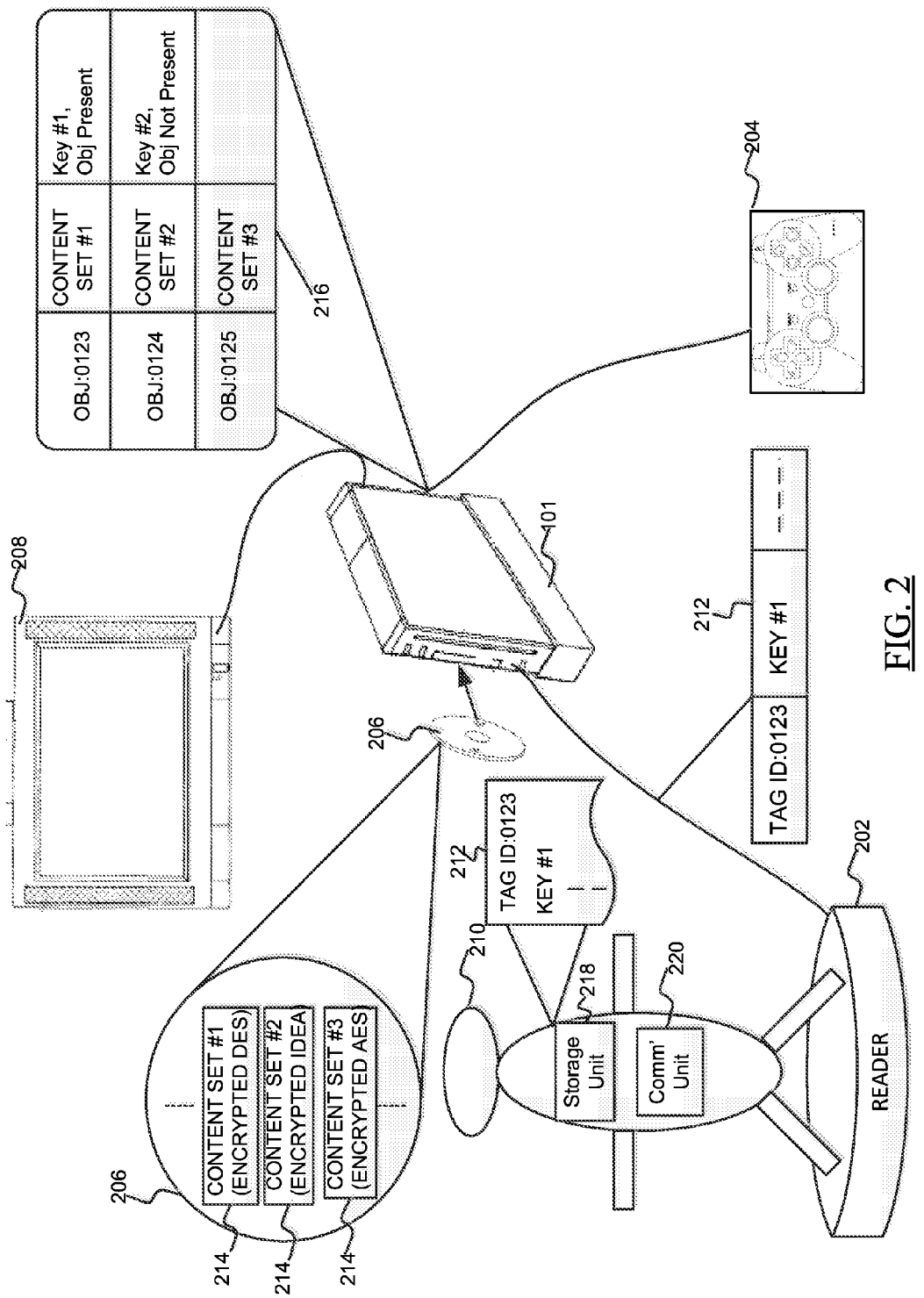
FIG. 2 illustrates one example of implementing encrypted content in a game using the device as shown in FIG. 1.

FIG. 2 illustrates one example of implementing encrypted content in a game using a device as shown in FIG. 1. It will be described with references to FIG. 1. As shown, the device 101 is operatively connected to a reader 202, a game control pad 204, and a display 208 in this example. As also shown in this example, a physical object, i.e., an action figure, 210 is placed on the reader 202. As shown, the reader 202 obtains information 212 stored on the physical object 210, and transmits the information 212 to the device 101. It should be appreciated that although one reader and one physical object are illustrated in this example, this is not intended to be limiting. In some other examples, multiple readers and/or physical objects present on the readers may be operatively connected to the console.

As shown, the physical object 210 comprises a storage unit 218 and a communication unit 220 in this example. The storage unit 218 may be configured to store information 212 regarding the physical object 210 as illustrated. The communication unit 220 may be configured to communicate the information stored in a storage unit 218 to the reader using technologies such as, but not limited to, RFID, NCF, Bluetooth, and/or any suitable technologies for communicating the information 212 to the reader. As used herein, "unit" refers to any suitable executing software module, hardware, executing firmware or any suitable combination thereof that can perform the desired function, such as programmed processors, configured hardware chips, discrete logic, state machine, to name a few. Although not shown in this example, the physical object 210 may comprise any other components such as a processor, a display, a speaker, and/or any other components.

As illustrated, the information 212 comprises information indicating a tag ID associated with the physical object 210 and a decryption key for decrypting encrypted content associated with the physical object 210 in this example. Although not shown in this example, the information 212 may comprise other information regarding the physical object 210, such as information indicating one or more sets of encrypted content are associated with the physical object 210 for implementation in the game, user progress information related to the physical object 210 in the game, and/or any other information regarding the physical object 210. In some examples, information such as user progress in the game related to the physical object 210 may be communicated to the physical object 210 from the device 101 via the reader 202 (e.g. the user progress information may be embedded in radio frequency signals readable by the communication unit 220 of the physical object 210), and stored in the storage unit 218. In those examples, such user progress information may be communicated to the device 101 via the reader 202 responsive to the presence of the physical object on the reader 202 and may be incorporated in the game by console, e.g., via the game module 112.

As shown in this example, the device 101 is configured to implement content in a game stored on media such as the DVD disc 206 shown in this example. It should be appreciated although it is illustrated in this example that the game content is stored on physical media such as the DVD disc 206, this is merely illustrative and thus not intended to be limiting. The game content may be stored on any form of media including, but not limited to, digital media such as cloud storage and/or any other forms of media in some other examples. In this example, the DVD disc 206 may comprise multiple sets of content for implementation in the game. As shown, such content may include one or more sets of encrypted content 214 associated with physical objects. As also shown, the device 101 may be configured with a table 216 that specifies associations between physical objects and corresponding encrypted content. In this example, as shown, the physical object 210, i.e. physical object 0123 as indicated by the tag ID stored on the physical object 210, is associated with content set number 1; object 0124 is associated with content set number 2; and physical object 0125 is associated was content set number 3. In this example, the table 216 also specifies information indicating whether the physical objects are present on the reader and whether description keys have been received from the physical objects. Such information may be recorded in the table 216 by the console, e.g., via the object detection module 114, based on the information 212 received from the reader 202. In this example, as specified by the table 216, the object 0123, i.e., the physical object 210 is present on the reader and a decryption key associated with physical object 210 has been received; and object 0124 is not present on the reader but a decryption key associated with object 0124 has been received; and object 0125 is not present on the reader and a decryption key has not been received from the object 0125.

Based on the information specified in the table 216, the device 101 may determine that the physical object 210 is present on the reader and a decryption key associated with physical object 210 has been received, e.g., via the object detection module 114. Responsive to such a determination, the device 101 may decrypt content set number 1 using decryption key associated with the physical object 210 and implement the decrypted content set number 1 in the instance of the game for presentation on the display 208.

Figure 3:
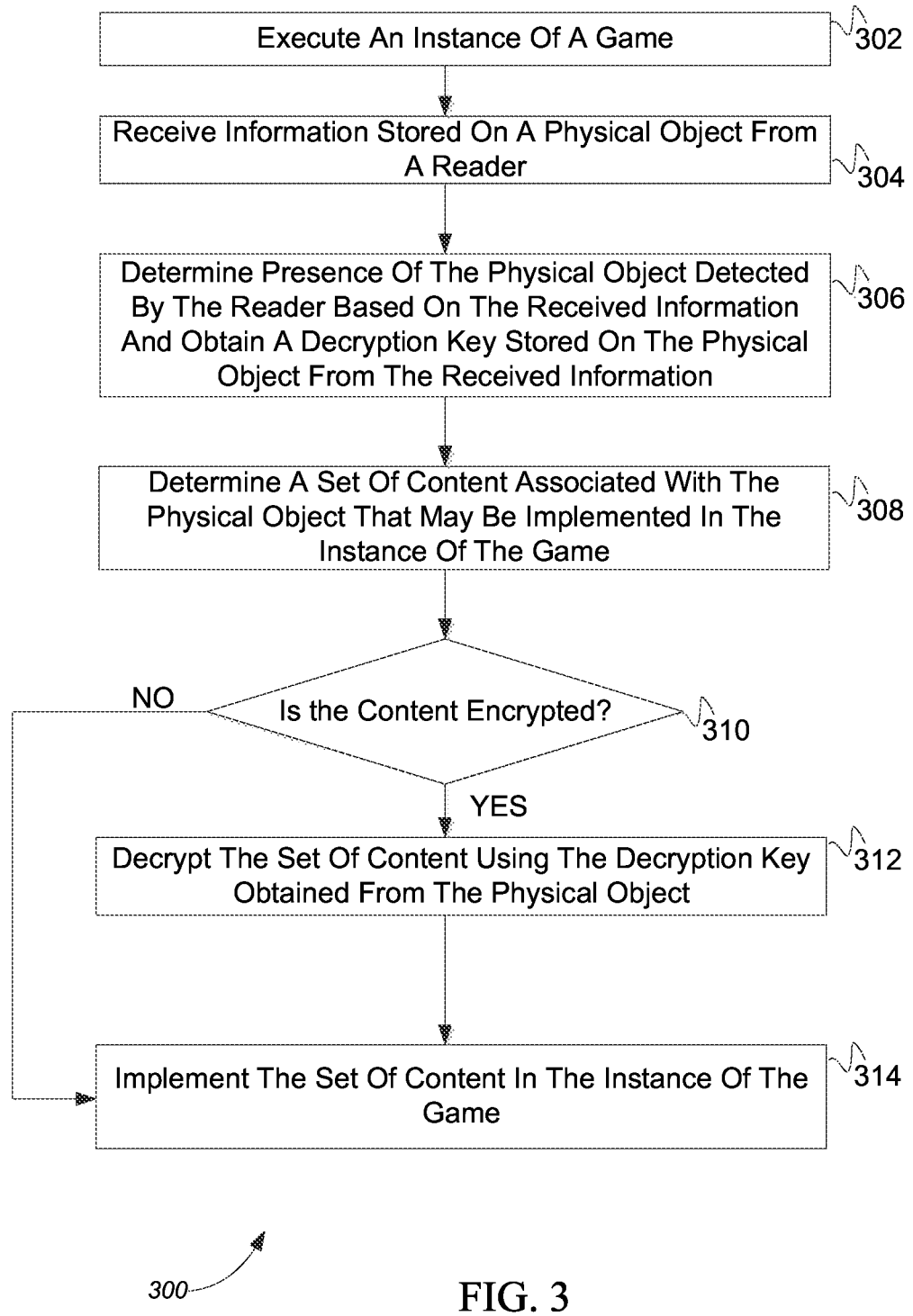
FIG. 3 illustrates an example of method for implementing encrypted content in a game.

FIG. 3 illustrates an example of method 300 for implementing encrypted content in a game. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At operation 302, an instance of the game may be executed. The instance of the game may be executed by implementing content in the game. The instance of the game may provide character, story, topography, plot, game actions, activities, gameplay, and/or any other game components associated with physical objects, such as, without limitation, action figure toys corresponding to movie characters. In some implementations, operation 302 may be performed by a game module the same as or similar to game module 112 (shown in FIG. 1 and described herein).

At operation 304, information stored on a physical object may be received from a reader. The reader may be configured to obtain such information from the physical object using technologies such as, but not limited to, RFID, NFC, Bluetooth, and/or any other communication technologies for reading information stored on a physical object. In some implementations, operation 304 may be performed by object detection module the same as or similar to object detection module 114 (shown in FIG. 1 and described herein).

At operation 306, presence of the physical object detected by the reader may be determined based on the information received in the operation 304, and a decryption key stored on the physical object may be obtained from the received information. The received information may include identification information of the physical object, a decryption key associated with the physical object, and/or any other information that may be stored on a physical object. Based on such information, the presence of the physical object on the reader may be determined, for example, by examining the identification information of the physical object. The decryption key may be obtained by parsing the received information using semantics preconfigured by a developer, provider, and/or any other entity related to a device. In some implementations, operation 306 may be performed by object detection module the same as or similar to object detection module 114 (shown in FIG. 1 and described herein).

At operation 308, a set of content associated with the physical object whose presence being detected by the reader has been determined in operation 306 may be determined such that the set of content may be implemented in the instance of the game. In some examples, for such determinations, an association between the set of content and the physical object may be specified by the provider, developer, and/or any other entities related to a game during a development stage of the game. Simultaneously or alternatively, such determinations may be made by examining the information received in operation 304, which may include an association between the physical object present on the reader and the set of content. In some implementations, operation 308 may be performed by object detection module the same as or similar to object detection module 114 (shown in FIG. 1 and described herein).

At operation 310, a determination that the content determined in the operation 308 is encrypted may be made. In some implementations, such a determination may be made based on meta-information included in the set of content. In some implementations, operation 310 may be performed by object detection module the same as or similar to object detection module 114 (shown in FIG. 1 and described herein).

At operation 312, the set of content that is determined to be encrypted in the operation 310 may be decrypted by using the decryption key obtained from the physical object. In some implementations, operation 312 may be performed by decryption module the same as or similar to the decryption module 116 (shown in FIG. 1 and described herein).

At operation 314, the set of content that is associated with the physical object whose presence being detected by the reader and decrypted in the operation 312 may be implemented in the instance of the game. In some examples, the set of content may not be encrypted as determined in the operation 310. In those examples, the set of content may be implemented in the instance of the game simply responsive to the presence of the physical object being detected by the reader, without decrypting the set of content. In some implementations, operation 302 may be performed by a game module the same as or similar to game module 112 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A device for implementing encrypted content in a game, the device comprising:
    one or more processors configured to execute computer program modules, the computer program modules comprising:
        a game module configured to execute an instance of a game by implementing content associated with physical objects;
        an object detection module configured to receive information indicating presence of the physical objects detected by a reader operatively coupled to or included in the device and to receive decryption keys stored on the physical objects through the reader; and
        a decryption module configured to decrypt encrypted content such that responsive to a presence of a first physical object being detected by the reader and responsive to receiving first decryption key stored on the first physical object, the decryption module decrypts a first set of encrypted content associated with the first physical object using the first decryption key; and, wherein
        the game module is further configured to implement the decrypted first set of content in the instance of the game responsive to the presence of the first physical object being detected by the reader.

2. The device of claim 1, wherein
    the decryption module is further configured such that responsive to a presence of a second physical object being detected by the reader and responsive to receiving a second decryption key stored on the second physical object, the decryption module decrypts a second set of encrypted content associated with the second physical object using the second decryption key; and
    the game module is further configured to implement the decrypted second set of content in the instance of the game responsive to the presence of the second physical object being detected by the reader.

3. The device of claim 2, further comprising electronic storage configured to store the sets of content for implementation in the instance of the game, wherein the electronic storage stores the first set and second set of encrypted content.

4. The device of claim 3, wherein the decryption module is configured such that the decryption module cannot decrypt the first set of encrypted content using the second decryption key and cannot decrypt the second set of encrypted content using the first decryption key.

5. The device of claim 3, wherein the first set and the second set of the encrypted content are encrypted by ciphers.

6. The device of claim 5, wherein the ciphers include one or more of a symmetric cipher or an asymmetric cipher.

7. The device of claim 6, wherein the symmetric cipher corresponds to data encryption standard, advanced encryption standard and/or international data encryption algorithm.

8. The device of claim 6, wherein the asymmetric cipher corresponds to RSA encryption algorithm, DSA encryption algorithm, and/or Diffie-Hellman algorithm.

9. The device of claim 1, wherein the object detection module is further configured to determine that the physical objects whose presence being detected by the reader correspond to the encrypted content for implementation in the game such that responsive to the presence of the first object being detected by the reader, the object detection module determines that the first physical object corresponds to the first set of encrypted content.

10. A method for implementing encrypted content in a game using a device operatively connected to a reader, the method being implemented in one or more physical processors configured to execute computer program modules, the method comprising:
   executing an instance of a game by implementing content associated with physical objects;
   receiving information indicating presence of the physical objects detected by a reader and receiving decryption keys stored on the physical objects through the reader;
   responsive to a presence of a first physical object being detected on the reader and responsive to receiving first decryption key stored on the first physical object, decrypting a first set of encrypted content associated with the first physical object using the first decryption key; and
   implementing the decrypted first set of content in the instance of the game responsive to the presence of the first physical object being detected by the reader.

11. The method of claim 10, further comprising
   responsive to a presence of a second physical object being detected by the reader and responsive to receiving a second decryption key stored on the second physical object, decrypting a second set of encrypted content associated with the second physical object using the second decryption key; and
   implementing the decrypted second set of content in the instance of the game responsive to the presence of the second physical object being detected by the reader.

12. The method of claim 11, further comprising storing the sets of content for implementation in the instance of the game on electronic storage included in the device, wherein the electronic storage stores the first set and second set of encrypted content.

13. The method of claim 12, wherein the first set of encrypted content cannot be decrypted by using the second decryption key and the second set of encrypted content cannot be decrypted by using the first decryption key.

14. The method of claim 12, wherein the first set and the second set of the encrypted content are encrypted by ciphers.

15. The method of claim 14, wherein the ciphers include one or more of a symmetric cipher or an asymmetric cipher.

16. The method of claim 15, wherein the symmetric cipher corresponds to data encryption standard, advanced encryption standard and/or international data encryption algorithm.

17. The method of claim 15, wherein the asymmetric cipher corresponds to RSA encryption algorithm, DSA encryption algorithm, and/or Diffie-Hellman algorithm.

18. The method of claim 10, further comprising determining that the physical objects whose presence being detected by the reader correspond to the encrypted content such that responsive to the presence of the first object being detected by the reader, determining the first physical object corresponds to the first set of encrypted content.

19. An action figure toy configured to facilitate implementing encrypted content associated with the action figure toy in a game, wherein the action figure toy comprises:
   a storage unit configured to store information regarding the action figure toy, the stored information regarding the action figure toy comprising one or more decryption keys for decrypting the encrypted content associated with the action figure toy; and
   a communication unit configured to communicate the information stored in the storage unit with a reader operatively connected to the action figure toy such that responsive to the action figure toy being present on the reader, the communication unit communicates the decryption keys to the reader.

20. The action figure toy of claim 19, wherein the storage unit is further configured to store information indicating a first set of encrypted content is associated with the action figure toy for implementation in the game, and wherein the communication unit is further configured to communicate the information indicating the first set of encrypted content is associated with the action figure toy to the reader responsive to the action figure toy being present on the reader.

* * * * *